United States Patent
Burns, III et al.

(10) Patent No.: US 11,638,397 B2
(45) Date of Patent: May 2, 2023

(54) CONTROL ASSEMBLY COUPLED TO HANDLE OF AN IMPLEMENT

(71) Applicant: TECHTRONIC CORDLESS GP, Anderson, SC (US)

(72) Inventors: James I. Burns, III, Simpsonville, SC (US); Seth H. Chapman, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 346 days.

(21) Appl. No.: 16/786,459

(22) Filed: Feb. 10, 2020

(65) Prior Publication Data

US 2021/0243948 A1      Aug. 12, 2021

(51) Int. Cl.
*A01D 34/82*      (2006.01)
*A01D 34/00*      (2006.01)
(Continued)

(52) U.S. Cl.
CPC ......... *A01D 34/824* (2013.01); *A01D 34/006* (2013.01); *A01D 34/68* (2013.01);
(Continued)

(58) Field of Classification Search
CPC ...... A01D 34/006; A01D 34/08; A01D 34/40; A01D 34/46; A01D 34/62; A01D 34/67;
(Continued)

(56) References Cited

U.S. PATENT DOCUMENTS

| 1,387,578 A | 8/1921 | Yost |
| 1,850,326 A | 3/1932 | Kelly |

(Continued)

FOREIGN PATENT DOCUMENTS

| CA | 2397429 A1 | 2/2004 |
| CH | 391387 A | 4/1965 |

(Continued)

OTHER PUBLICATIONS

American National Standard for Consumer Turf Care Equipment, "Pedestrian-Controlled Mowers and Ride-on Mowers—Safety Specifications", published Apr. 23, 2012, pp. 16-17.
(Continued)

*Primary Examiner* — Adam J Behrens
(74) *Attorney, Agent, or Firm* — Michael Best & Friedrich LLP

(57) ABSTRACT

A handle is configured to be coupled to an implement to guide the implement during operation. The handle includes a first member configured to be coupled to a main body of the implement, a second member movably coupled to the first member between a retracted position and an extended position, and a locking mechanism coupled between the first member and the second member. The locking mechanism is moveable between a locked position, in which the second member is fixed relative to the first member, and an unlocked position, in which the second member is movable relative to the first member. The handle also includes a control assembly configured to allow operation of the implement in response to the locking mechanism being moved into the locked position.

13 Claims, 12 Drawing Sheets

(51) Int. Cl.
*A01D 34/68* (2006.01)
*A01D 101/00* (2006.01)

(52) U.S. Cl.
CPC .... *A01D 34/828* (2013.01); *A01D 2034/6843* (2013.01); *A01D 2101/00* (2013.01)

(58) Field of Classification Search
CPC ...... A01D 34/82; A01D 34/86; A01D 34/902; A01D 2034/6843; A01D 2101/00; A01D 75/18; A01D 75/20; A01D 34/824; A01D 34/828
See application file for complete search history.

(56) References Cited

U.S. PATENT DOCUMENTS

| | | |
|---|---|---|
| 1,866,380 A | 7/1932 | Wagner |
| 1,896,442 A | 2/1933 | Farmer |
| 2,067,916 A | 1/1937 | Haffner et al. |
| 2,332,892 A | 10/1943 | Clemson |
| 2,347,991 A | 5/1944 | Cummings |
| 2,484,795 A | 10/1949 | Schofield |
| D158,847 S | 6/1950 | Flanigan |
| 2,513,685 A | 7/1950 | Smith et al. |
| 2,515,573 A | 7/1950 | Soenksen |
| 2,658,322 A | 11/1953 | Sullivan |
| 2,672,002 A | 3/1954 | Nelson |
| 2,688,834 A | 9/1954 | Kaeser |
| 2,715,808 A | 8/1955 | Heineke |
| 2,724,598 A | 11/1955 | Knarzer |
| 2,727,753 A | 12/1955 | Johnson et al. |
| 2,757,013 A | 7/1956 | Brier |
| 2,763,492 A | 9/1956 | Phelps |
| 2,786,694 A | 3/1957 | Gray |
| 2,791,079 A | 5/1957 | Funk |
| 2,791,437 A | 5/1957 | Knarzer |
| 2,809,490 A | 10/1957 | Oeters |
| 2,817,548 A | 12/1957 | Uthemann |
| 2,821,258 A | 1/1958 | Benson et al. |
| 2,829,483 A | 4/1958 | Oeters |
| 2,849,249 A | 8/1958 | Fridolph |
| 2,965,386 A | 12/1960 | Buske |
| 2,966,365 A | 12/1960 | Kortum |
| 3,004,375 A | 10/1961 | Seyffer |
| 3,035,719 A | 5/1962 | McClean |
| 3,038,737 A | 6/1962 | Lill |
| 3,089,301 A | 5/1963 | Przekop |
| 3,116,937 A | 1/1964 | Price |
| 3,130,444 A | 4/1964 | Stollsteimer |
| 3,142,950 A | 8/1964 | West |
| 3,144,258 A | 8/1964 | Ottosen et al. |
| 3,174,471 A | 3/1965 | Weglage et al. |
| 3,203,707 A | 8/1965 | Anderson |
| 3,230,695 A | 1/1966 | West |
| 3,243,196 A | 3/1966 | Amis |
| 3,246,909 A | 4/1966 | Siwek |
| 3,253,391 A | 5/1966 | Meldahl |
| 3,357,716 A | 12/1967 | Musichuk |
| 3,423,103 A | 1/1969 | Maltarp |
| 3,462,924 A | 8/1969 | Price et al. |
| 3,465,505 A | 9/1969 | Krinke |
| 3,481,123 A | 12/1969 | Lessig, III |
| 3,485,017 A | 12/1969 | Duran et al. |
| 3,496,706 A | 2/1970 | Mattson |
| 3,527,469 A | 9/1970 | Gobin |
| 3,534,432 A | 10/1970 | Davies, III et al. |
| 3,603,065 A | 9/1971 | Weber |
| 3,604,187 A | 9/1971 | Weber |
| 3,642,051 A | 2/1972 | Goldner |
| 3,649,997 A | 3/1972 | Thorud |
| 3,702,016 A | 11/1972 | Keesee |
| 3,747,430 A | 7/1973 | Miner |
| 3,756,336 A | 9/1973 | Mattingley |
| 3,764,156 A | 10/1973 | Nepper et al. |
| 3,816,873 A | 6/1974 | Thorud et al. |
| 3,817,547 A | 6/1974 | Erickson |
| 3,855,763 A | 12/1974 | Seifert et al. |
| 3,950,817 A | 4/1976 | McKaig |
| 3,982,082 A | 9/1976 | Thorud et al. |
| 3,998,476 A | 12/1976 | Kazmark, Sr. |
| 4,003,190 A | 1/1977 | Braun et al. |
| 4,015,406 A | 4/1977 | Witt et al. |
| 4,043,102 A | 8/1977 | Uhlinger et al. |
| 4,044,532 A | 8/1977 | Lessig, III |
| 4,054,394 A | 10/1977 | Neuman |
| 4,071,922 A | 2/1978 | Davies, III et al. |
| 4,108,456 A | 8/1978 | Woelffer et al. |
| 4,110,869 A | 9/1978 | Hastings |
| 4,161,639 A | 7/1979 | Nofel |
| 4,167,221 A | 9/1979 | Edmonson et al. |
| 4,212,363 A | 7/1980 | Letner et al. |
| 4,216,363 A | 8/1980 | Nofel |
| 4,221,108 A | 9/1980 | Owens |
| 4,245,456 A | 1/1981 | Zipfel |
| 4,326,370 A | 4/1982 | Thorud |
| 4,327,541 A | 5/1982 | Emory |
| 4,362,228 A | 12/1982 | Plamper et al. |
| 4,363,206 A | 12/1982 | Schmitt |
| 4,392,538 A | 7/1983 | Goertzen |
| 4,394,893 A | 7/1983 | Kronich et al. |
| 4,413,466 A | 11/1983 | Beugelsdyk et al. |
| 4,426,563 A | 1/1984 | Grogan |
| 4,428,180 A | 1/1984 | Carlson |
| 4,432,191 A | 2/1984 | Schmitt |
| 4,435,105 A | 3/1984 | Rampley |
| 4,492,170 A | 1/1985 | Solomon |
| 4,503,958 A | 3/1985 | Nishio |
| 4,531,347 A | 7/1985 | Schutz |
| 4,561,239 A | 12/1985 | Cook |
| 4,573,307 A | 3/1986 | Wick |
| 4,596,484 A | 6/1986 | Nakatani |
| 4,599,912 A | 7/1986 | Barnard et al. |
| 4,603,478 A | 8/1986 | Anderson |
| 4,659,884 A | 4/1987 | Wollenhaupt |
| 4,738,084 A | 4/1988 | Ogano et al. |
| 4,753,062 A | 6/1988 | Roelle |
| 4,761,092 A | 8/1988 | Nakatani |
| 4,833,935 A | 5/1989 | Roelle |
| 4,850,182 A | 7/1989 | Barnard et al. |
| 4,870,811 A | 10/1989 | Steele |
| 4,882,897 A | 11/1989 | Oshima et al. |
| 4,899,446 A * | 2/1990 | Akiba .................. A01D 34/90 30/296.1 |
| 4,936,160 A | 6/1990 | Barnard et al. |
| 4,981,011 A | 1/1991 | Olejak |
| 4,987,729 A | 1/1991 | Paytas |
| 5,020,308 A | 6/1991 | Braun et al. |
| 5,088,273 A | 2/1992 | Braun et al. |
| 5,138,824 A | 8/1992 | Oshima et al. |
| 5,155,985 A | 10/1992 | Oshima et al. |
| 5,163,275 A | 11/1992 | Hare et al. |
| 5,203,147 A | 4/1993 | Long |
| 5,209,051 A | 5/1993 | Langdon |
| 5,261,215 A | 11/1993 | Hartz et al. |
| 5,269,125 A | 12/1993 | Langley, Sr. et al. |
| 5,307,612 A | 5/1994 | Tomiyama et al. |
| 5,558,210 A | 9/1996 | Jonischus |
| 5,591,109 A | 1/1997 | Strnad |
| 5,606,851 A | 3/1997 | Bruener et al. |
| 5,636,504 A | 6/1997 | Kaley et al. |
| 5,653,096 A | 8/1997 | Edwards |
| 5,692,856 A | 12/1997 | Newman, Jr. et al. |
| 5,746,074 A | 5/1998 | Collins |
| 5,772,162 A | 6/1998 | Lin |
| 5,784,868 A | 7/1998 | Wadzinski et al. |
| 5,791,805 A | 8/1998 | Lynch et al. |
| 5,806,374 A | 9/1998 | Mizutani et al. |
| 5,842,329 A | 12/1998 | Carter |
| 5,894,715 A | 4/1999 | Braun et al. |
| 6,006,434 A | 12/1999 | Templeton et al. |
| 6,078,015 A | 6/2000 | Martinez |
| 6,082,083 A | 7/2000 | Stalpes et al. |
| 6,095,294 A | 8/2000 | McGourthy, Sr. et al. |
| 6,101,678 A | 8/2000 | Malloy et al. |

(56) References Cited

U.S. PATENT DOCUMENTS

| | | |
|---|---|---|
| 6,124,791 A | 9/2000 | Wolf |
| 6,142,699 A | 11/2000 | Pao |
| 6,158,089 A | 12/2000 | Monahan et al. |
| 6,220,005 B1 | 4/2001 | Plamper et al. |
| 6,317,930 B1 | 11/2001 | Hung |
| 6,404,078 B1 | 6/2002 | Thomas et al. |
| 6,449,935 B1 | 9/2002 | Nicolay et al. |
| 6,581,246 B1 | 6/2003 | Polette |
| 6,644,002 B2 | 11/2003 | Trefz |
| 6,658,829 B2 | 12/2003 | Kobayashi et al. |
| 6,698,173 B2 | 3/2004 | Joseph |
| 6,751,936 B2 | 6/2004 | Kucera et al. |
| 6,796,392 B2 | 9/2004 | Kobayashi et al. |
| 6,902,024 B2 | 6/2005 | Miiler et al. |
| 6,996,960 B1 | 2/2006 | Flemm |
| 6,996,963 B2 | 2/2006 | Peter et al. |
| 7,131,499 B2 | 11/2006 | Breneman et al. |
| 7,178,322 B2 | 2/2007 | Osborne |
| 7,179,200 B1 | 2/2007 | Wu |
| 7,231,755 B2 | 6/2007 | Clarke |
| 7,237,620 B2 | 7/2007 | Abenroth et al. |
| 7,263,817 B1 | 9/2007 | Smith |
| 7,263,818 B2 | 9/2007 | Osborne |
| 7,275,322 B2 | 10/2007 | Stones |
| 7,293,397 B2 | 11/2007 | Osborne |
| 7,314,096 B2 | 1/2008 | Shaffer et al. |
| 7,367,409 B2 | 5/2008 | Stones |
| 7,401,660 B2 | 7/2008 | Stones |
| 7,496,990 B2 | 3/2009 | Qiao |
| 7,543,430 B2 | 6/2009 | Kaskawitz et al. |
| 7,591,126 B2 | 9/2009 | Cox |
| 7,624,998 B2 | 12/2009 | Barlow et al. |
| 7,707,812 B2 | 5/2010 | Cheung |
| 7,712,292 B2 | 5/2010 | Stover et al. |
| 7,762,049 B2 | 7/2010 | Eaton et al. |
| 8,132,289 B2 | 3/2012 | Hahn |
| 8,274,004 B2 | 9/2012 | Selzer |
| 8,316,510 B2 | 11/2012 | Anraku et al. |
| 8,359,821 B2 | 1/2013 | Park |
| 8,448,293 B2 | 5/2013 | Sepke |
| 8,635,744 B2 | 1/2014 | Junk et al. |
| 8,713,761 B2 | 5/2014 | Grewe et al. |
| 8,813,733 B2 | 8/2014 | Tamura et al. |
| 8,839,692 B2 | 9/2014 | Yanai et al. |
| 8,925,293 B2 | 1/2015 | Mikula et al. |
| 9,038,356 B2 | 5/2015 | Shao et al. |
| 9,060,463 B2 * | 6/2015 | Yamaoka ............... H01H 3/16 |
| 9,109,616 B1 | 8/2015 | Ballentine |
| 9,179,597 B1 | 11/2015 | Kaspar |
| 9,218,924 B2 | 12/2015 | Coussins et al. |
| 9,232,692 B2 | 1/2016 | Bjorn et al. |
| 9,462,747 B2 | 10/2016 | Schmalz |
| 9,491,907 B2 | 11/2016 | Edholm et al. |
| 9,496,809 B2 | 11/2016 | Nakano et al. |
| 9,596,806 B2 | 3/2017 | Yamaoka et al. |
| 9,648,805 B2 * | 5/2017 | Nie .................. F16B 7/1418 |
| 9,651,138 B2 | 5/2017 | Helin et al. |
| 9,826,686 B2 | 11/2017 | Yamaoka et al. |
| 9,847,186 B2 | 12/2017 | Wadzinski |
| 9,855,490 B2 | 1/2018 | McGuffie |
| 9,888,627 B2 | 2/2018 | Yamaoka et al. |
| 9,955,627 B2 | 5/2018 | Nakano et al. |
| 9,986,686 B2 | 6/2018 | Yamaoka et al. |
| 10,039,229 B2 | 8/2018 | Wadzinski et al. |
| 10,070,588 B2 | 9/2018 | Yamaoka et al. |
| 10,111,381 B2 | 10/2018 | Shaffer et al. |
| 10,123,478 B2 | 11/2018 | Shaffer et al. |
| 10,433,478 B2 | 10/2019 | Smith et al. |
| 10,477,772 B2 | 11/2019 | Yamaoka et al. |
| 10,485,169 B2 * | 11/2019 | Yamaoka ............. A01D 34/828 |
| 10,485,176 B2 | 11/2019 | Yamaoka et al. |
| 10,492,365 B2 | 12/2019 | Yamaoka et al. |
| 10,524,420 B2 | 1/2020 | Yamaoka et al. |
| 11,246,262 B2 * | 2/2022 | Yamaoka ............. A01D 34/824 |
| 2003/0006074 A1 | 1/2003 | Ishikawa et al. |
| 2003/0093983 A1 | 5/2003 | Savard et al. |
| 2004/0194982 A1 | 10/2004 | Fukzumi et al. |
| 2005/0144919 A1 | 7/2005 | Osborne |
| 2006/0005673 A1 | 1/2006 | Long et al. |
| 2006/0053762 A1 | 3/2006 | Stover et al. |
| 2006/0053763 A1 | 3/2006 | Stover et al. |
| 2006/0075641 A1 | 4/2006 | Nottingham et al. |
| 2006/0075732 A1 | 4/2006 | Nottingham et al. |
| 2006/0096135 A1 | 5/2006 | Shaffer et al. |
| 2006/0127167 A1 | 6/2006 | Hsieh |
| 2006/0166792 A1 | 7/2006 | Kuo |
| 2007/0101690 A1 | 5/2007 | Stover et al. |
| 2007/0256402 A1 | 11/2007 | McCane et al. |
| 2008/0078156 A1 | 4/2008 | Qiao |
| 2008/0256919 A1 | 10/2008 | Schreiner |
| 2009/0038281 A1 | 2/2009 | Kaskawitz et al. |
| 2009/0107282 A1 | 4/2009 | Mangham |
| 2009/0293655 A1 | 12/2009 | Tseng et al. |
| 2010/0162674 A1 | 7/2010 | Eaton et al. |
| 2010/0199949 A1 | 8/2010 | Tamura et al. |
| 2011/0088362 A1 | 4/2011 | Rosa et al. |
| 2011/0126502 A1 | 6/2011 | Pitman et al. |
| 2011/0219565 A1 | 9/2011 | Sepke |
| 2011/0302893 A1 | 12/2011 | Park |
| 2011/0302895 A1 | 12/2011 | Park |
| 2012/0055277 A1 | 3/2012 | Wu |
| 2012/0305041 A1 | 12/2012 | Lah et al. |
| 2012/0317948 A1 | 12/2012 | Abe et al. |
| 2012/0317949 A1 | 12/2012 | Abe et al. |
| 2012/0324682 A1 | 12/2012 | Ballentine et al. |
| 2013/0111866 A1 | 5/2013 | Schmalz |
| 2013/0212996 A1 | 8/2013 | Shao et al. |
| 2013/0305675 A1 | 11/2013 | Pare |
| 2014/0102064 A1 | 4/2014 | Yamaoka et al. |
| 2014/0167398 A1 | 6/2014 | Burns et al. |
| 2014/0190141 A1 | 7/2014 | Edholm et al. |
| 2014/0196425 A1 | 7/2014 | Lewis |
| 2014/0374557 A1 | 12/2014 | Yu |
| 2016/0324065 A1 | 11/2016 | Smith et al. |
| 2016/0353660 A1 | 12/2016 | Yamaoka et al. |
| 2017/0049047 A1 | 2/2017 | Yamaoka et al. |
| 2017/0049049 A1 | 2/2017 | Yamaoka et al. |
| 2017/0086370 A1 | 3/2017 | Yamaoka et al. |
| 2017/0086375 A1 | 3/2017 | Yamaoka et al. |
| 2017/0367258 A1 | 12/2017 | Shaffer et al. |
| 2018/0228089 A1 | 8/2018 | Yamaoka et al. |
| 2019/0269073 A1 | 9/2019 | Yamaoka et al. |
| 2020/0000030 A1 | 1/2020 | Wei et al. |
| 2020/0060091 A1 | 2/2020 | Yamaoka et al. |
| 2022/0117155 A1 * | 4/2022 | Kippes ................ A01D 69/10 |

FOREIGN PATENT DOCUMENTS

| | | |
|---|---|---|
| CN | 101006763 A | 8/2007 |
| CN | 201044581 Y | 4/2008 |
| CN | 201146132 Y | 11/2008 |
| CN | 201360427 Y | 12/2009 |
| CN | 201455951 U | 5/2010 |
| CN | 101822148 A | 9/2010 |
| CN | 201821663 U | 5/2011 |
| CN | 102217455 A | 10/2011 |
| CN | 202019551 U | 11/2011 |
| CN | 202019551 U * | 11/2011 |
| CN | 202026623 U | 11/2011 |
| CN | 102845186 A | 1/2013 |
| CN | 103283374 A | 9/2013 |
| CN | 204119802 U | 1/2015 |
| CN | 104823599 A | 8/2015 |
| CN | 204796180 U | 11/2015 |
| CN | 106625459 A | 5/2017 |
| CN | 107046921 A | 8/2017 |
| CN | 107182426 A | 9/2017 |
| CN | 206596381 U | 10/2017 |
| CN | 207443478 U | 10/2017 |
| CN | 206629456 U | 11/2017 |
| CN | 107455067 A | 12/2017 |
| CN | 206790995 U | 12/2017 |
| CN | 207120188 U | 3/2018 |
| CN | 108684299 A | 10/2018 |

(56) References Cited

FOREIGN PATENT DOCUMENTS

| | | | | |
|---|---|---|---|---|
| CN | 207940017 | U | | 10/2018 |
| CN | 108718664 | A | | 11/2018 |
| CN | 108834543 | A | | 11/2018 |
| CN | 109392418 | A | | 3/2019 |
| CN | 208798363 | U | | 4/2019 |
| DE | 2632526 | A1 | | 1/1978 |
| DE | 3827926 | A1 | | 2/1990 |
| DE | 102004020985 | A1 | | 11/2005 |
| DE | 202006015259 | U | | 2/2007 |
| DE | 102010044302 | A1 | | 3/2012 |
| DE | 102017205320 | A1 | | 10/2018 |
| DE | 102017205320 | A1 * | 10/2018 | ........... A01D 34/824 |
| EP | 0047416 | A1 | | 3/1982 |
| EP | 0185513 | A1 | | 6/1986 |
| EP | 0822346 | A1 | | 2/1998 |
| EP | 0903074 | A1 | | 3/1999 |
| EP | 0981945 | A2 | | 3/2000 |
| EP | 1106046 | A1 | | 6/2001 |
| EP | 1431998 | A2 | | 6/2004 |
| EP | 1543711 | A2 | | 6/2005 |
| EP | 1543711 | A2 * | 6/2005 | ........... A01D 34/001 |
| EP | 1627560 | A1 | | 2/2006 |
| EP | 1741937 | A1 | | 1/2007 |
| EP | 1742008 | A1 | | 1/2007 |
| EP | 1949782 | A1 | | 7/2008 |
| EP | 2425700 | A2 | | 3/2012 |
| EP | 2465337 | A1 | | 6/2012 |
| EP | 2491777 | A1 | | 8/2012 |
| EP | 2556739 | A1 | | 2/2013 |
| EP | 2622953 | A1 | | 8/2013 |
| EP | 2689651 | A1 | | 1/2014 |
| EP | 2774470 | A1 | | 9/2014 |
| EP | 2774470 | A1 * | 9/2014 | ............. A01D 34/67 |
| EP | 2784335 | A1 | | 10/2014 |
| FR | 2348644 | A1 | | 11/1977 |
| FR | 2780375 | A1 | | 12/1999 |
| GB | 1064828 | A | | 4/1967 |
| GB | 2066033 | A | | 7/1981 |
| GB | 2386813 | A | | 10/2003 |
| GB | 2413254 | A | | 10/2005 |
| GB | 2449715 | A | | 12/2008 |
| JP | S63158120 | U | | 10/1988 |
| JP | H01162916 | A2 | | 6/1989 |
| JP | H01235516 | A2 | | 9/1989 |
| JP | H01312923 | A2 | | 12/1989 |
| JP | 02003226 | U | | 1/1990 |
| JP | H0584102 | U | | 11/1993 |
| JP | H06153650 | A2 | | 6/1994 |
| JP | 11346530 | A | | 12/1999 |
| JP | 2003125627 | A | | 5/2003 |
| JP | 2003130017 | A | | 5/2003 |
| JP | 2007116958 | A | | 5/2007 |
| JP | 2008283926 | A | | 11/2008 |
| JP | 2009034000 | A | | 2/2009 |
| JP | 2010274668 | A | | 12/2010 |
| JP | 2013146241 | A | | 8/2013 |
| JP | 2013153753 | A | | 8/2013 |
| WO | 2004086850 | A1 | | 10/2004 |
| WO | 2011026416 | A1 | | 3/2011 |
| WO | 2012115543 | A1 | | 8/2012 |
| WO | 2013015171 | A1 | | 1/2013 |
| WO | 2013122266 | A2 | | 8/2013 |
| WO | WO-2013122266 | A2 * | 8/2013 | ............. A01D 34/90 |
| WO | 2018086034 | A1 | | 5/2018 |
| WO | 2018237251 | A1 | | 12/2018 |

OTHER PUBLICATIONS

Extended European Search Report for Application No. 21154743.5 dated Jun. 21, 2021 (9 pages).

* cited by examiner

CONTROL ASSEMBLY COUPLED TO HANDLE OF AN IMPLEMENT

FIELD OF THE DISCLOSURE

The present disclosure relates to an implement including a handle (e.g., a telescoping handle), and more particularly to a control assembly coupled to the telescoping handle that controls operation of the implement.

SUMMARY

In one aspect, an implement is configured to be supported on a surface. The implement includes a main body, a working member coupled to the main body, and a motor coupled to the main body. The motor is operable to move the working member. The implement also includes a handle configured to guide the implement during operation. The handle includes a first member coupled to the main body, a second member movably coupled to the first member between a retracted position and an extended position, and a locking mechanism coupled between the first member and the second member, the locking mechanism moveable between a locked position, in which the second member is fixed relative to the first member, and an unlocked position, in which the second member is movable relative to the first member. The implement further includes a control assembly configured to allow operation of the implement in response to the locking mechanism being moved into the locked position.

In another aspect, a handle is configured to be coupled to an implement to guide the implement during operation. The handle includes a first member configured to be coupled to a main body of the implement, a second member movably coupled to the first member between a retracted position and an extended position, and a locking mechanism coupled between the first member and the second member. The locking mechanism is moveable between a locked position, in which the second member is fixed relative to the first member, and an unlocked position, in which the second member is movable relative to the first member. The handle also includes a control assembly configured to allow operation of the implement in response to the locking mechanism being moved into the locked position.

In yet another aspect, a handle is configured to be coupled to an implement to guide the implement during operation. The handle includes a first member configured to be coupled to a main body of the implement, a second member movably coupled to the first member between a retracted position and an extended position, and a locking mechanism coupled between the first member and the second member. The locking mechanism is moveable between a locked position, in which the second member is fixed relative to the first member, and an unlocked position, in which the second member is movable relative to the first member. The handle also includes a control assembly having a control processor configured to detect when the locking mechanism is in the unlocked position, disable operation of the implement when the locking mechanism is in the unlocked position, detect when the locking mechanism is in the locked position, and allow operation of the implement when the locking mechanism is in the locked position.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc. are understood by those of ordinary skill to refer to reasonable ranges outside of the given value, for example, general tolerances associated with manufacturing, assembly, and use of the described embodiments.

Figure 1:
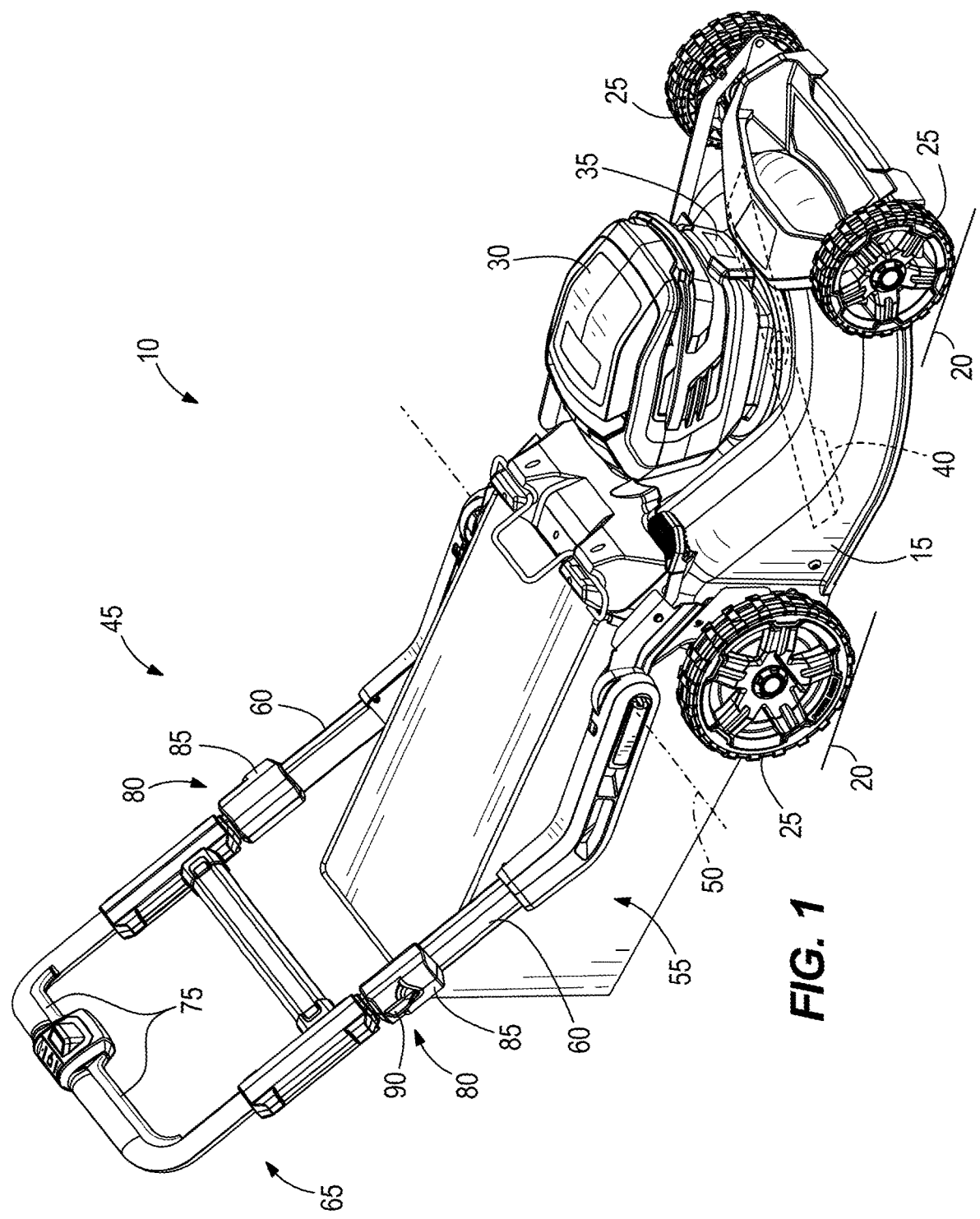
FIG. 1 is a perspective view of an implement (e.g., a lawnmower) including a telescoping handle in a retracted position.

FIG. 1 illustrates an implement (e.g., a self-propelled, walk-behind lawnmower 10) including a main body 15 supported above a surface 20 by wheels 25 coupled to the main body 15. The main body 15 also includes a motor housing 30 that supports an electric motor and at least one battery pack operable to drive the electric motor. In particular, the electric motor and the battery pack are electrically coupled to a control processor 35 coupled to the main body 15 (e.g., the motor housing 30) for the control processor 35 to selectively control the electric motor. The main body 15 further includes a working member (e.g., a rotatable blade 40) that is driven by the electric motor. In the illustrated embodiment, the electric motor can also drive at least one of the wheels 25 for the lawnmower 10 to be self-propelled. In other embodiments, the implement can be different (e.g., a snow thrower, ground tiller, etc.) such that the working member can be, for example, a snow thrower auger, a ground tilling blade, etc.

Figure 2:
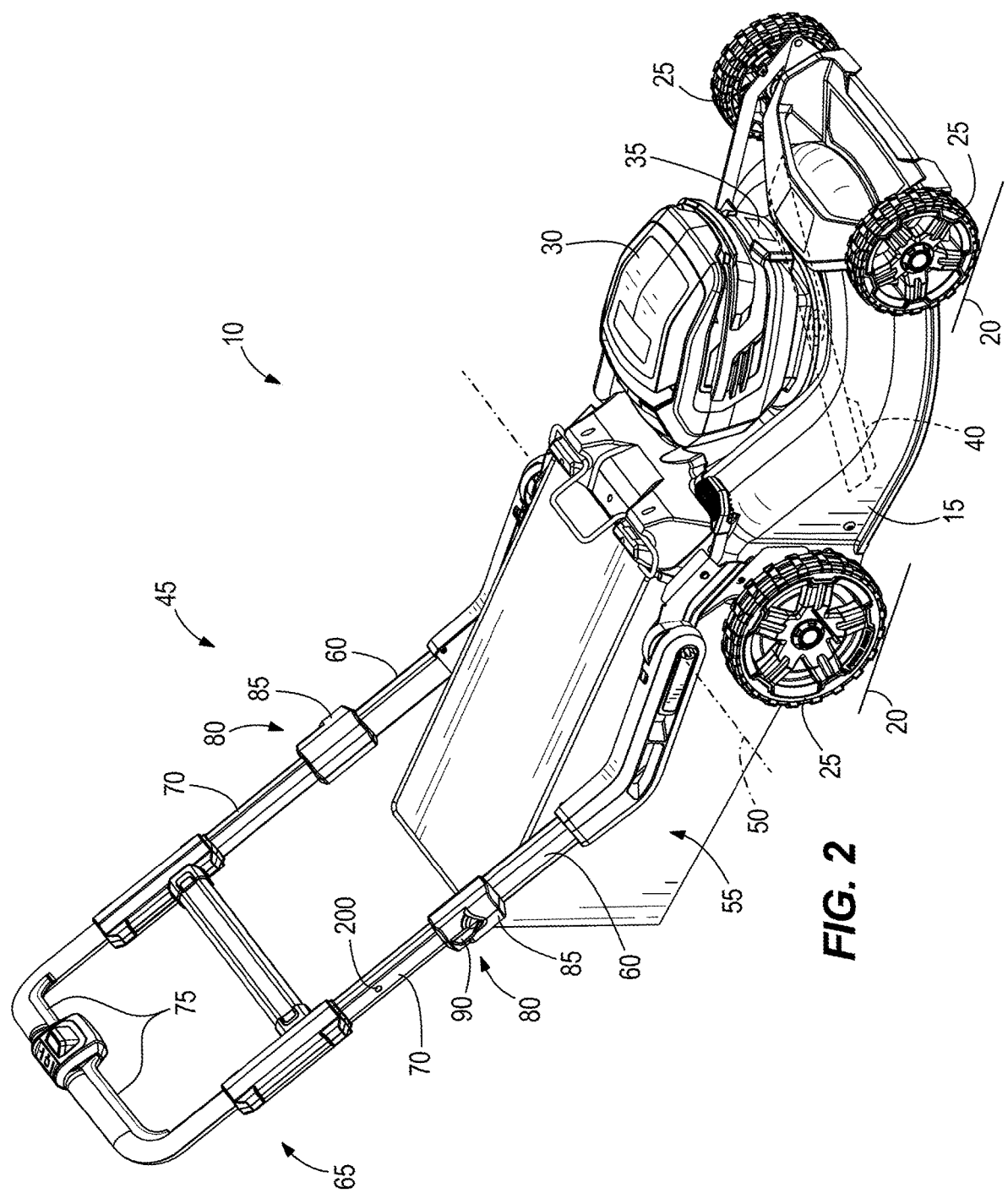
FIG. 2 is a perspective view of the lawnmower of FIG. 1 illustrating the telescoping handle in an extended position.

With reference to FIGS. 1 and 2, the lawnmower 10 includes a telescoping handle 45 pivotably coupled to the main body 15 about an axis 50 between an operating position (shown in FIGS. 1 and 2) and a storage position (not shown, but where the telescoping handle 45 is pivoted towards the main body 15 about the axis 50 to be positioned above the main body 15). Specifically, the telescoping handle 45 includes a lower portion 55 having two outer members (e.g., outer tubes 60) coupled to the main body 15 about the axis 50. The telescoping handle 45 also includes an upper portion 65 having two inner members (e.g., inner tubes 70) each received within one of the outer tubes 60 such that the telescoping handle 45 is slidable between a retracted position (FIG. 1) and an extended position (FIG. 2). The upper portion 65 also includes at least one actuation member (e.g., an actuation bail 75) electrically coupled to the control processor 35. In other embodiments, the control processor 35 can be coupled to the telescoping handle 45 rather than the main body 15. In further embodiments, the inner tubes 70 can be pivotably coupled to the main body 15 and the outer tubes 60 can include the bail 75. In yet further embodiments, the outer and inner tubes 60, 70 can be pivotably coupled to each other to pivot between the retracted position and the extended position.

Figure 3:
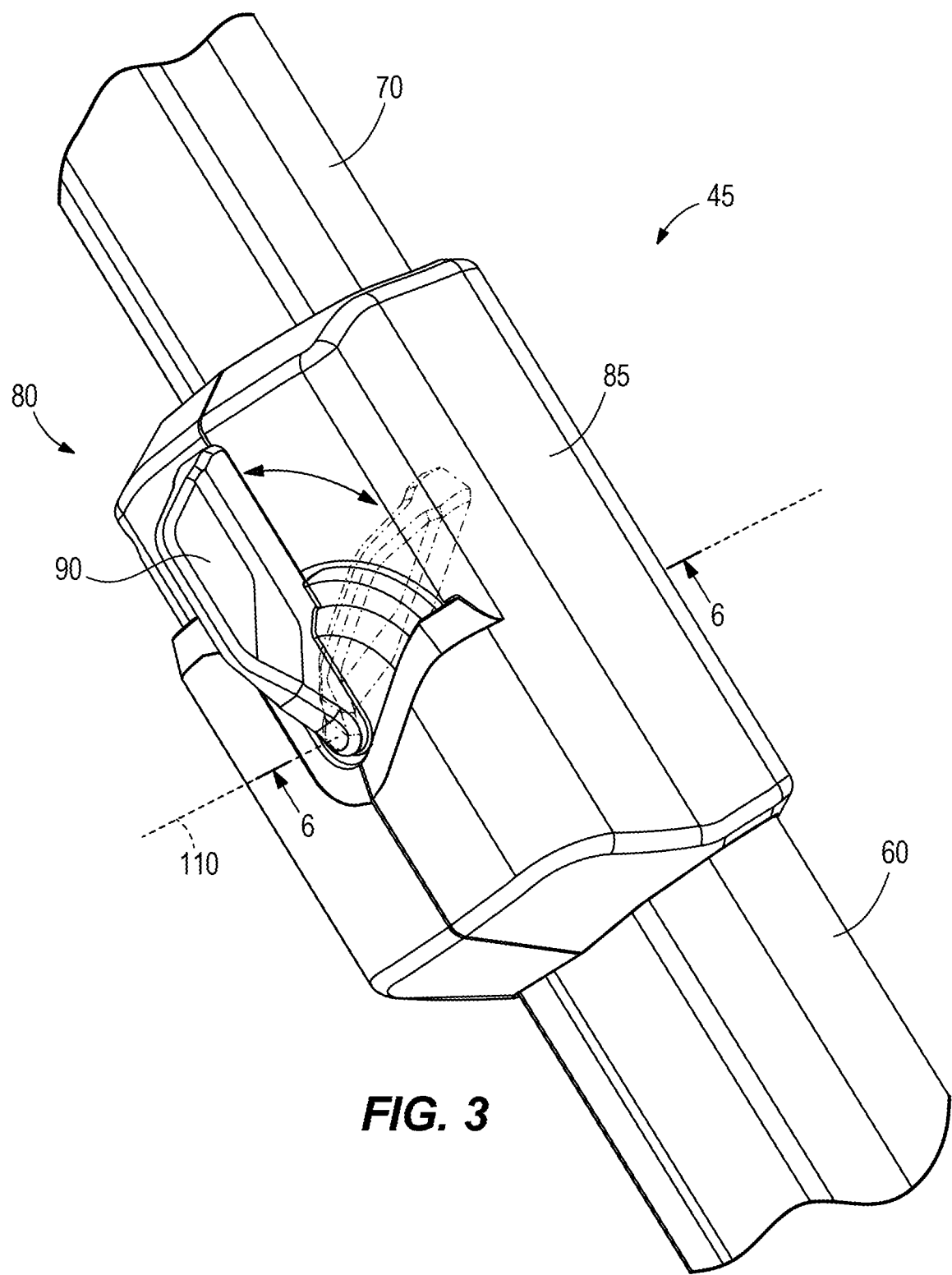
FIG. 3 is a detailed perspective view of the telescoping handle of FIG. 1 illustrating a portion of a locking mechanism of the telescoping handle.

As shown in FIG. 3, the telescoping handle 45 includes a locking mechanism 80 coupled between the lower portion 55 and the upper portion 65 of the telescoping handle 45. In the illustrated embodiment, the telescoping handle 45 includes two locking mechanisms 80 each associated with one pair of the outer and inner tubes 60, 70. In other embodiments, the telescoping handle 45 can include one locking mechanism 80 associated with one pair of the outer and inner tubes 60, 70. Both locking mechanisms 80 are substantially similar, as such, only one locking mechanism 80 is discussed in detail below.

Figure 4:
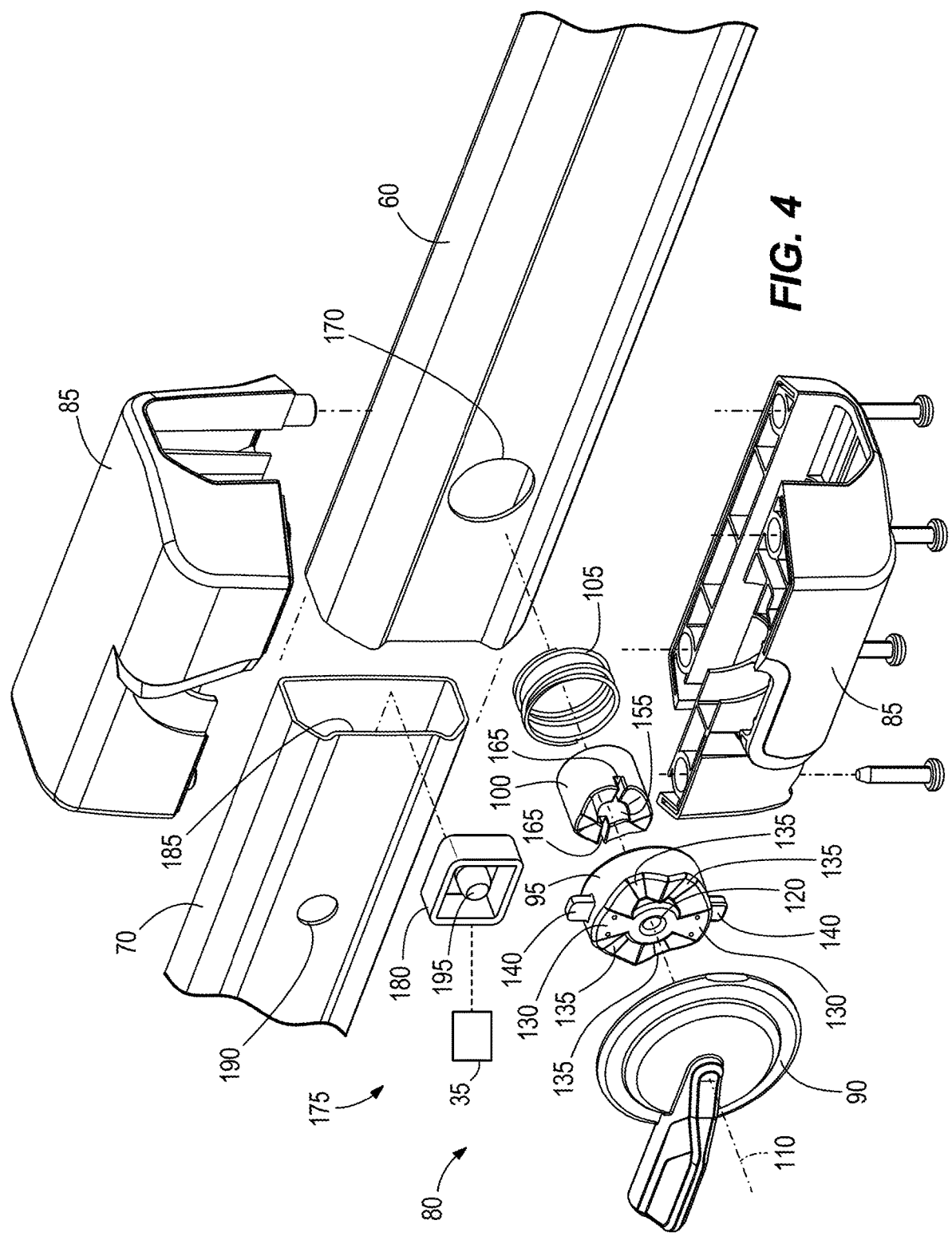
FIG. 4 is a first exploded view of the locking mechanism of FIG. 3 interfacing with a control assembly according to one embodiment of the disclosure.
Figure 5:
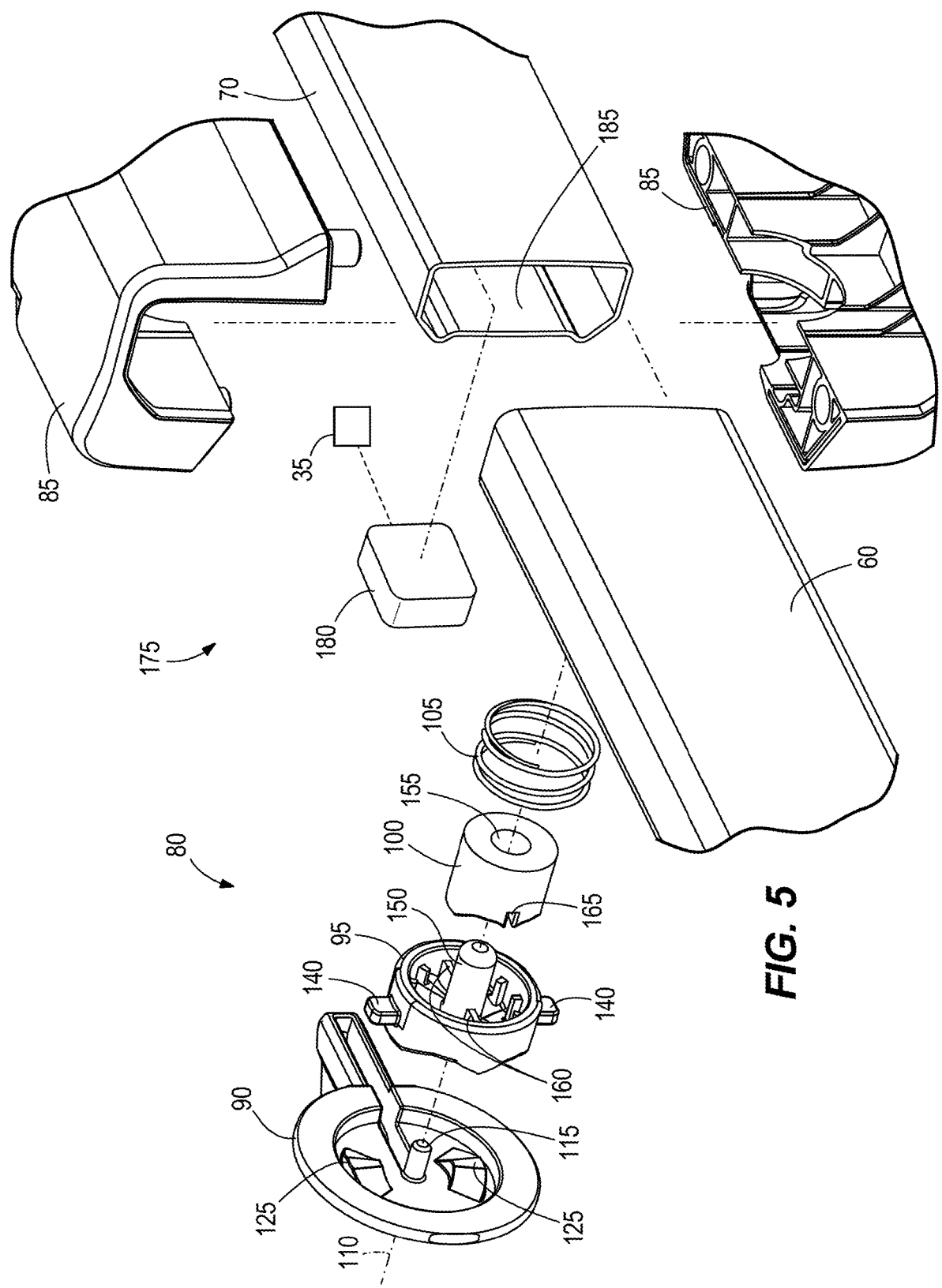
FIG. 5 is a second exploded view of the locking mechanism of FIG. 3.

With reference to FIGS. 4 and 5, the locking mechanism 80 includes a housing 85 fixed to the outer tube 60 and supports an actuation member (e.g., a lever 90), a cam member 95, a sleeve 100, and a biasing member 105 (e.g., a coil spring). The lever 90 is rotatable about an axis 110 between a locked position (illustrated in solid lines within FIG. 3) and an unlocked position (illustrated in broken lines within FIG. 3). The housing 85 supports the lever 90 to inhibit the lever 90 from linear movement along the axis 110. The illustrated lever 90 includes a post 115 received within an aperture 120 of the cam member 95 and protrusions 125 extending toward the cam member 95. The protrusions 125 engage raised surfaces 130 of the cam member 95 when the lever 90 is in the locked position, and the protrusions 125 engage recessed surfaces 135 of the cam member 95 when the lever 90 is in the unlocked position. The cam member 95 also includes tabs 140 received within slots 145 of the housing 85 (FIG. 6) to inhibit rotation of the cam member 95 about the axis 110, but allow axial movement of the cam member 95 along the axis 110.

With continued reference to FIGS. 4 and 5, the cam member 95 includes a pin 150 received within a bore 155 of the sleeve 100 and ribs 160 received within slots 165 of the sleeve 100. In the illustrated embodiment, the sleeve 100 is coupled to the cam member 95 (e.g., by the engagement between the ribs 160 and the slots 165) such that the sleeve 100 moves with the cam member 95 axially along the axis 110. In other embodiments, the cam member 95 can move relative to the sleeve 100. The illustrated biasing member 105 abuts the outer tube 60 to bias the cam member 95 towards the lever 90. In addition, the axis 110 extends through (e.g., is concentric) with an aperture 170 formed in the outer tube 60, and the pin 150 of the cam member 95 extends through the aperture 170. In other embodiments, the lever 90 can be a push-button actuator moveable along the axis 110, a pivotable actuator moveable transverse to the axis 110, a slidable actuator moveable transverse to the axis 110, etc. operable to move the pin 150.

Figure 7:
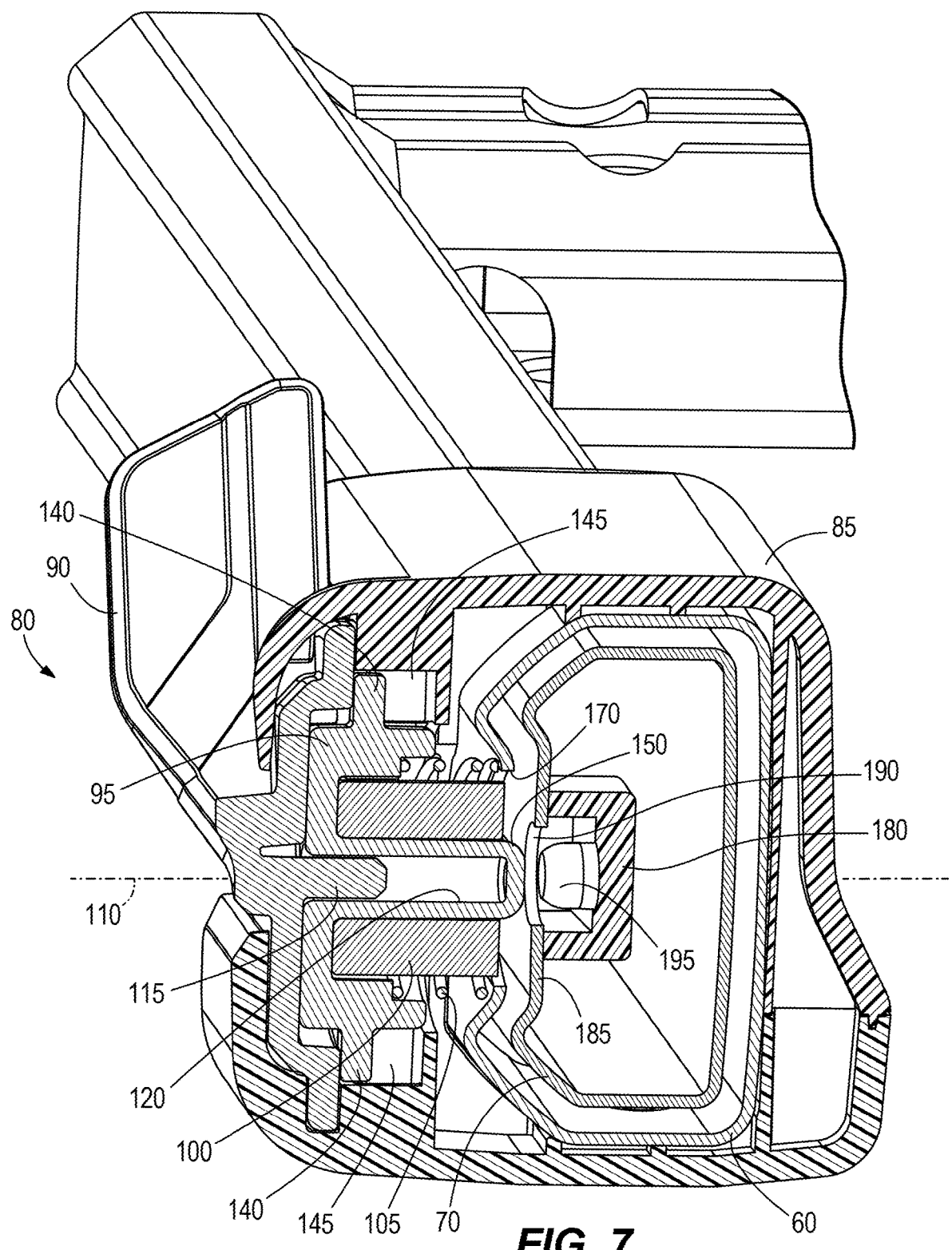
FIG. 7 is a cross sectional view of the locking mechanism taken along line 6-6 of FIG. 3 illustrating the locking mechanism in an unlocked position allowing the telescoping handle to move between the retracted position and the extended position.
Figure 8:
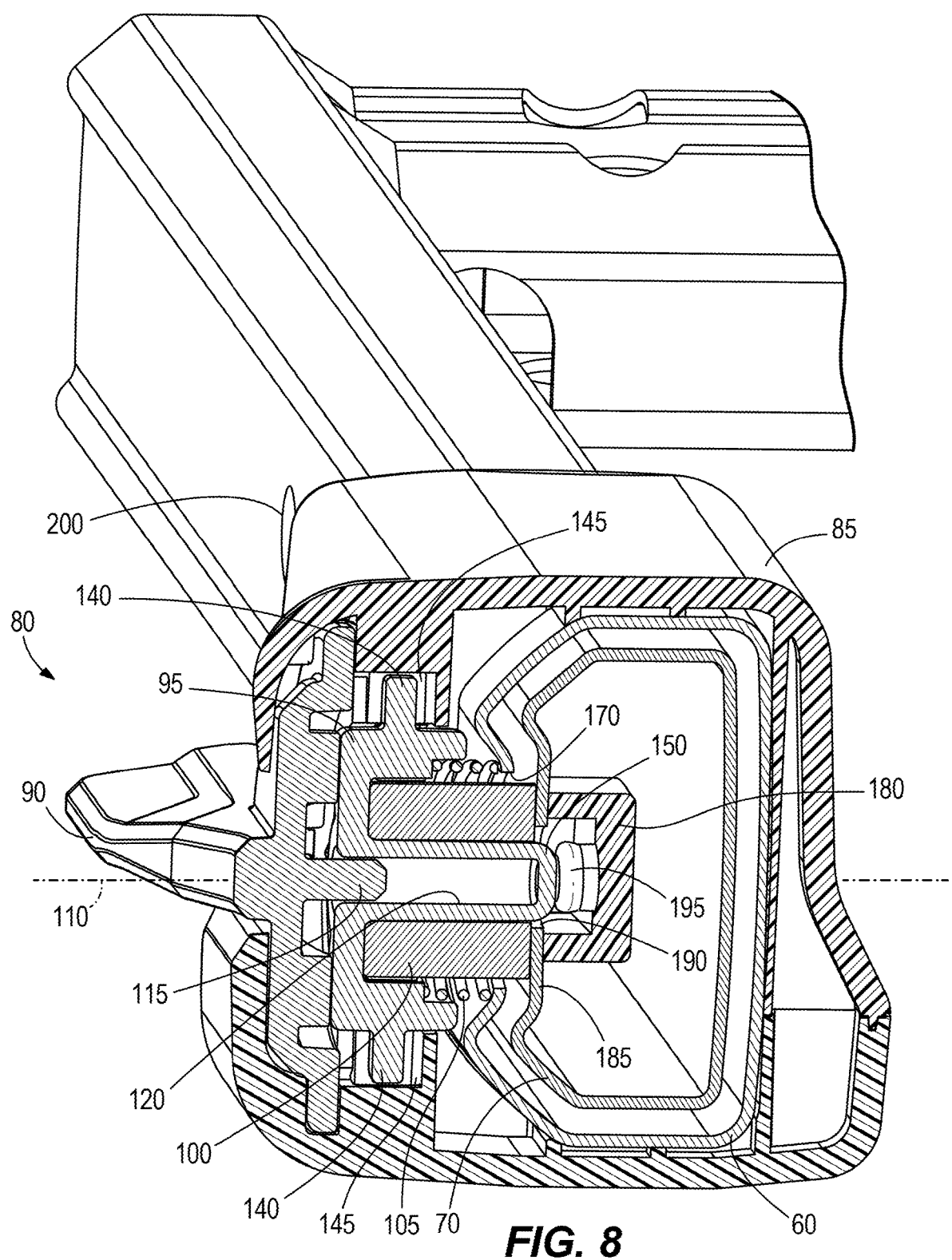
FIG. 8 is a cross sectional view of the locking mechanism taken along line 6-6 of FIG. 3 illustrating the locking mechanism in the locked position while the telescoping handle is in the extended position enabling operation of the lawnmower.
Figure 9:
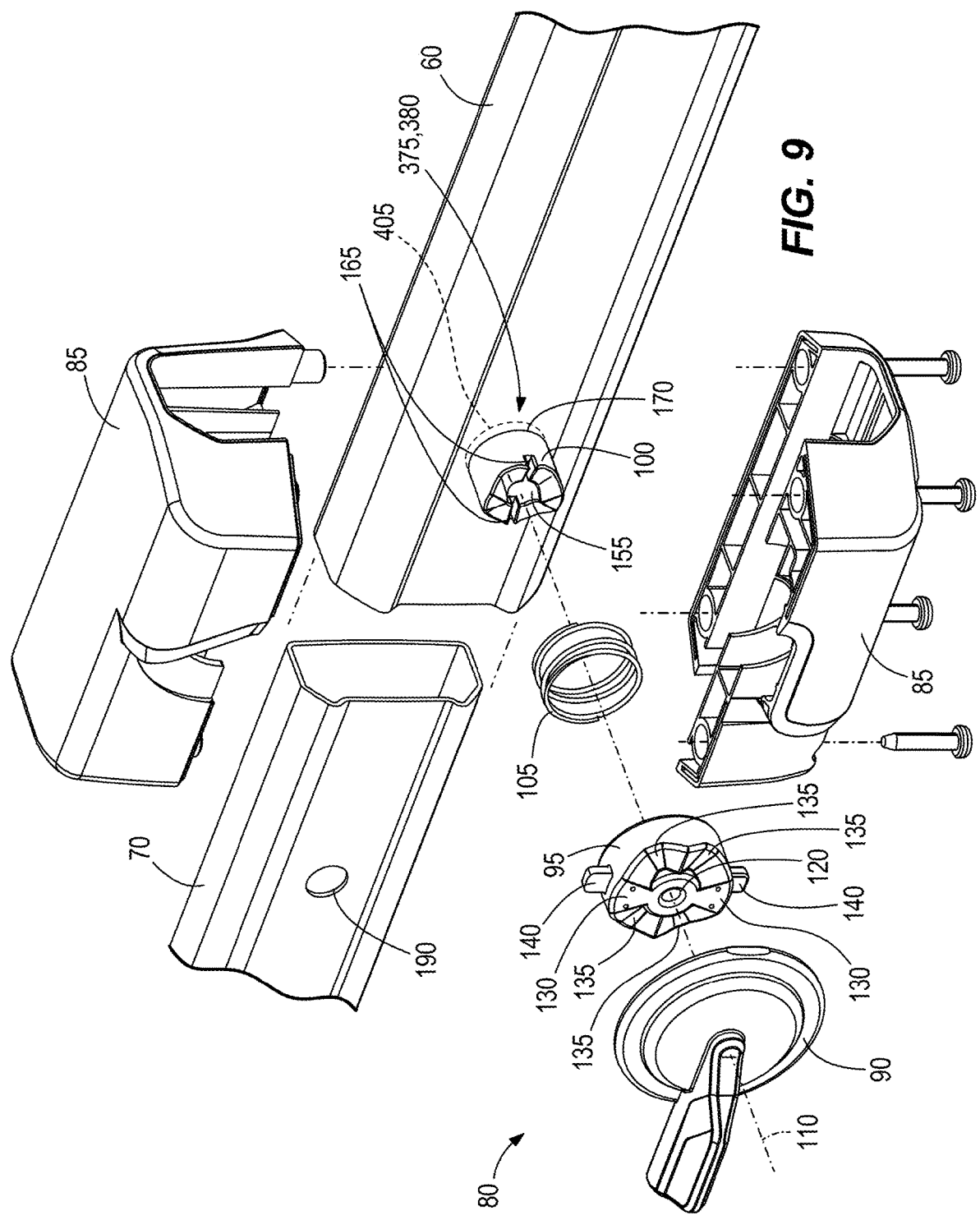
FIG. 9 is an exploded view of the telescoping handle of FIG. 1 interfacing with a control assembly according to another embodiment of the disclosure.

With continued reference to FIGS. 4 and 5, the lawnmower 10 includes a control assembly 175 in communication with one locking mechanism 80. The illustrated control assembly 175 includes a position sensor 180 coupled to an inner surface 185 of the inner tube 70 such that the position sensor 180 aligns with a lower aperture 190 formed in the inner tube 70. As such, the position sensor 180 moves with the inner tube 70 as the telescoping handle 45 moves between the extended position and the retracted position. The position sensor 180 is electrically coupled to the control processor 35 by wires routed internally through the outer and inner tubes 60, 70. In the illustrated embodiment, the position sensor 180 is a push-button contact switch including a plunger 195 moveable between a first state (e.g., an extended state; FIG. 7) and a second state (e.g., a retracted state; FIG. 8) with the plunger 195 biased into the extended state. In other embodiments, the position sensor 180 can be a different type of switch or sensor (e.g., toggle switch, slide switch, infrared sensor, etc.) that is actuated by direct contact or by proximity of an object. In further embodiments, the lawnmower 10 can include two control assemblies 175, each associated with one locking mechanism 80.

Figure 6:
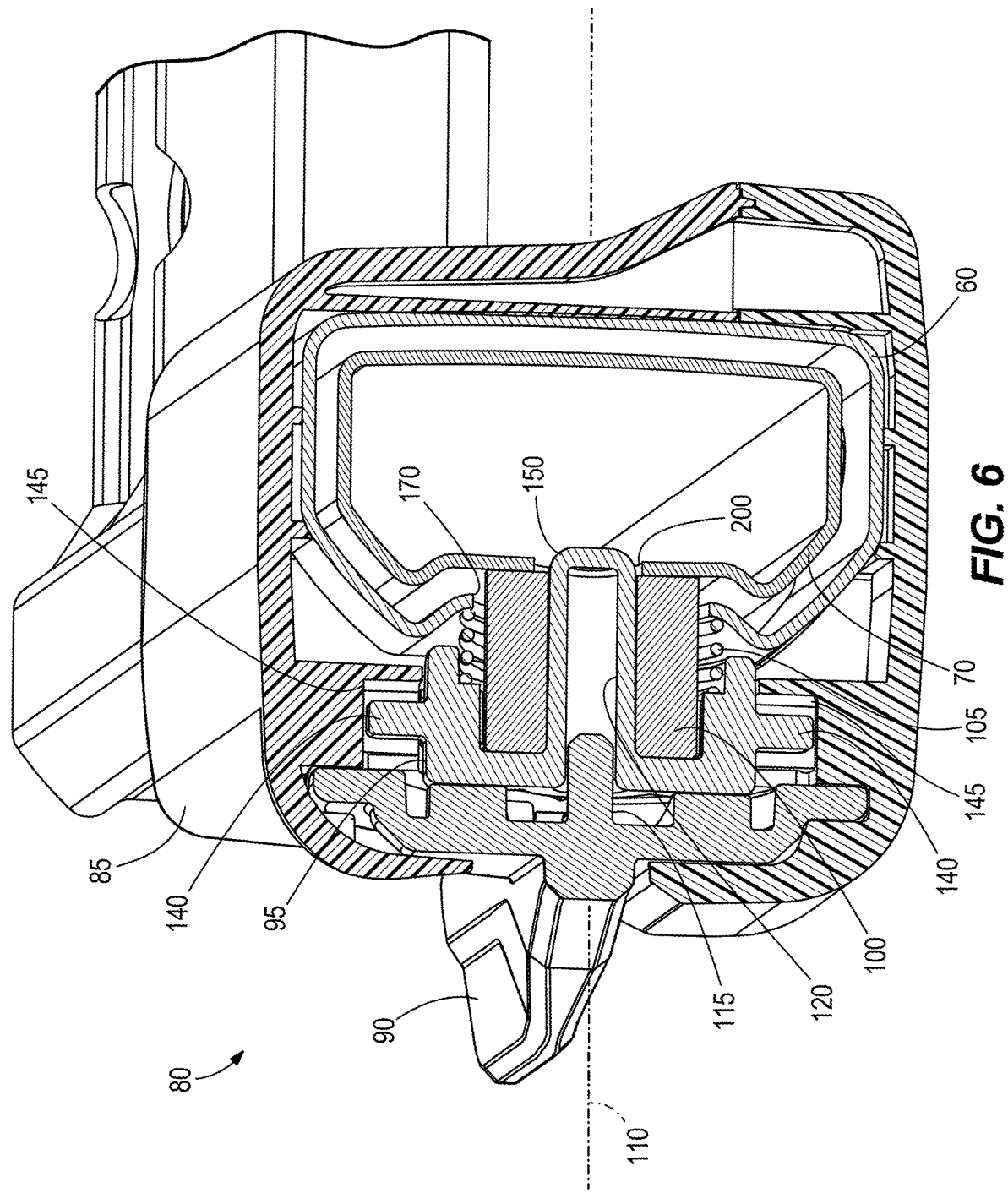
FIG. 6 is a cross sectional view of the locking mechanism taken along line 6-6 of FIG. 3 illustrating the locking mechanism in a locked position while the telescoping handle is in the retracted position.

As shown in FIGS. 6-8, the illustrated control assembly 175 enables operation of the lawnmower 10 (e.g., the control processor 35 enables the electric motor to drive the blade 40) when the locking mechanism 80 is in the locked position (FIG. 8) and the telescoping handle 45 is in the extended position (FIG. 2). Conversely, the control assembly 175 disables operation of the lawnmower 10 (e.g., the control processor 35 disables the electric motor) when the locking mechanism 80 is unlocked (FIG. 7) allowing movement of the telescoping handle 45 between the extended position and the retracted position. In addition, the control assembly 175 also disables operation of the lawnmower 10 when the locking mechanism 80 is in the locked position (FIG. 6) and the telescoping handle 45 is in the retracted position (FIG. 1).

In particular, when the telescoping handle 45 is in the retracted position (FIG. 1), the lever 90 can move into the locked position (FIG. 6) such that the protrusions 125 of the lever 90 engage the raised surfaces 130 of the cam member 95. In turn, the cam member 95 is axially moved inwardly toward the outer and inner tubes 60, 70 against the force of the biasing member 105. As shown in FIG. 6, the pin 150 of the cam member 95 extends through an upper aperture 200 (FIG. 2) formed in the inner tube 70 to lock the telescoping handle 45 in the retracted position. As the position sensor 180 is associated with the lower aperture 190—and not the upper aperture 200—of the inner tube 70, the pin 150 does not actuate the position sensor 180. As a result, the control assembly 175 disables operation of the lawnmower 10 (e.g., actuation of the bail 75 will not actuate rotation of the blade 40). In other words, when the locking mechanism 80 is in the locked position and the telescoping handle 45 is in the retracted position, the control processor 35 disables operation of the lawnmower 10.

Once the lever 90 is moved into the unlocked position (FIG. 7), the protrusions 125 slide on the cam member 95 to be received within the recessed surfaces 135 of the cam member 95. In turn, the cam member 95 is axially moved outwardly by the force of the biasing member 105 and the pin 150 is then spaced from the inner tube 70. The telescoping handle 45 can then move from the retracted position (FIGS. 1 and 6) to the extended position (FIGS. 2 and 7) such that the pin 150 aligns with the lower aperture 190 of the inner tube 70 and the position sensor 180. As the pin 150 still does not contact the position sensor 180 when the locking mechanism 80 is in the unlocked position (FIG. 7), the control processor 35 continues to disable operation of the lawnmower 10.

With reference to FIG. 8, the lever 90 is then moved back into the locked position to move the protrusions 125 back into engagement with the raised surfaces 130 of the cam member 95. In turn, the cam member 95 is axially moved inwardly for the pin 150 to be received within the lower aperture 190 of the inner tube 70. The pin 150 also moves to actuate the position sensor 180 by engaging the plunger 195. Accordingly, the control processor 35 detects the telescoping handle 45 is locked in the extended position to enable operation of the lawnmower 10 once the bail 75 is actuated. The control assembly 175 ensures the telescoping handle 45 is in the extended position, which provides a safe distance between the operator of the lawnmower 10 and the blade 40 during operation.

FIGS. 9-12 illustrate a control assembly 375 according to another embodiment for interfacing with the locking mechanism 80. The control assembly 375 is similar to the control assembly 175; therefore, similar components are designated with similar references numbers each incremented by 200. At least some differences and/or at least some similarities between the control assemblies 175, 375 will be discussed in detail below. In addition, components or features described with respect to only one or some of the embodiments described herein are equally applicable to any other embodiments described herein.

The illustrated control assembly 375 is coupled to the locking mechanism 80 such that the inner tubes 70 move relative to the control assembly 375 when the telescoping handle 45 moves between the extended position and the retracted position. In particular, the control assembly 375 includes a position sensor 380 having a first sensor 405 fixed relative to the outer tube 60. In the illustrated embodiment, the first sensor 405 is coupled to the sleeve 100, which is fixed to the outer tube 60. In other embodiments, the first sensor 405 can be spaced from the sleeve 100. The position sensor 380 also includes a second sensor 410 coupled to the pin 150, which moves axially relative to the sleeve 100 and the first sensor 405. Accordingly, the position sensor 380 is a hall effect sensor that detects a position of the second sensor 410 relative to the first sensor 405. The position sensor 380 is electrically coupled to the control processor 35 by wires routed externally relative to the outer and inner tubes 60, 70.

Figure 10:
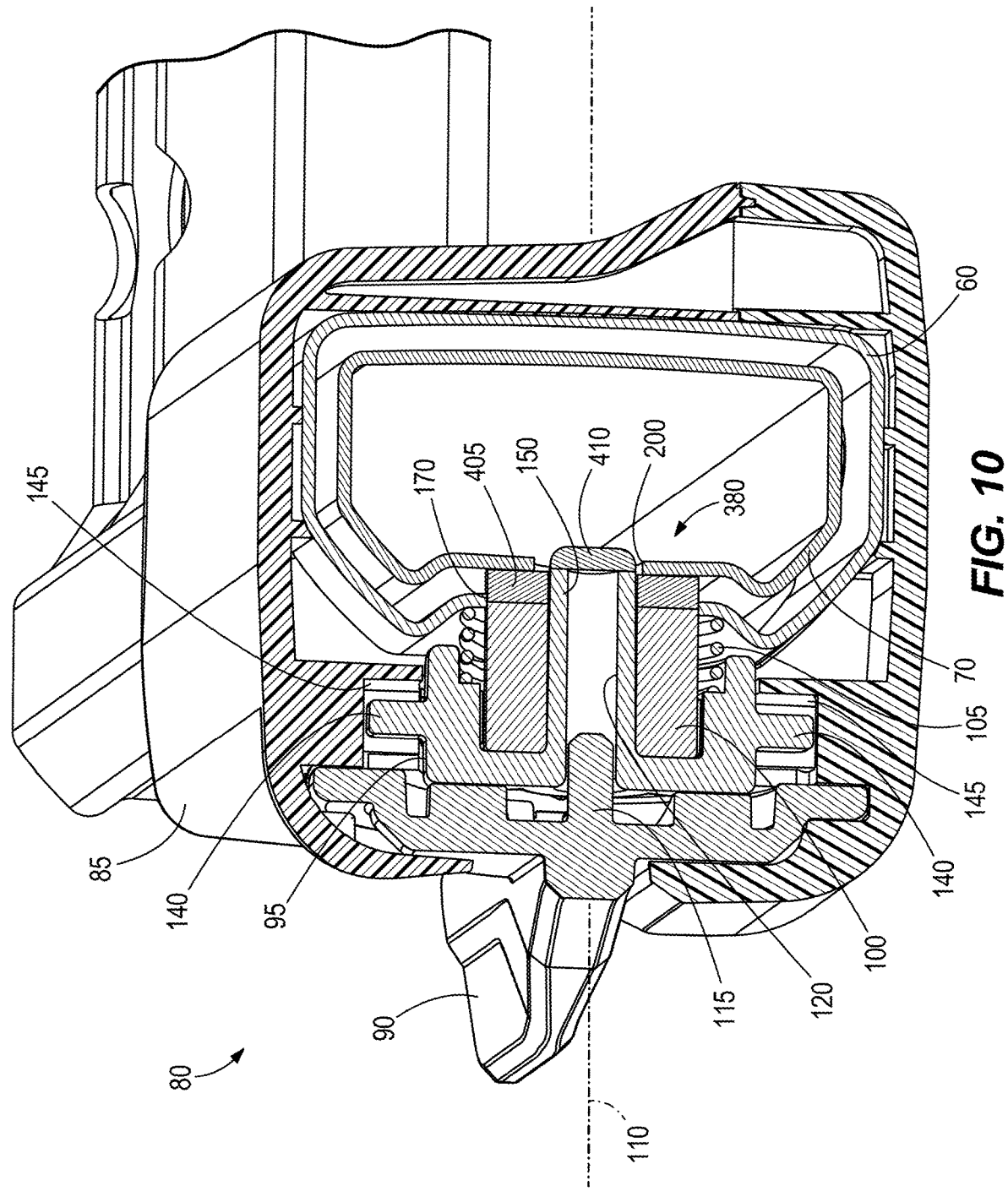
FIG. 10 is a cross sectional view of the locking mechanism of FIG. 9 illustrating the locking mechanism in a locked position while the telescoping handle is in the retracted position.

When the telescoping handle 45 is in the retracted position (FIG. 1), the locking mechanism 80 can move into the locked position (FIG. 10) in which the pin 150 extends through the upper aperture 200 of the inner tube 70 to lock the telescoping handle 45 in the retracted position. With reference to FIG. 10, the second sensor 410 is positioned relative to the first sensor 405 (e.g., misaligned with the first sensor 405 along the axis 110) such that the control assembly 375 detects the locking mechanism 80 is in the locked position. In other embodiments, the second sensor 410 can be positioned in alignment with the first sensor 405 when the locking mechanism 80 is in the locked position. In some embodiments, another position sensor can detect when the locking mechanism 80 is in the locked position while the telescoping handle 45 is in the retracted position to disable operation of the lawnmower 10. For example, the control assembly 375 can include a separate position sensor (similar to the position sensor 180) associated with the upper aperture 200 in which the pin 150 engages to disable operation of the lawnmower 10. In further embodiments, the locking mechanism 80 can be moved into a second locked position (different than the locked position shown in FIG. 12) associated with when the telescoping handle 45 is in the retracted position to disable operation of the lawnmower 10.

Once the locking mechanism 80 is moved into the unlocked position (FIG. 11), the second sensor 410 is moved relative to the first sensor 405 (e.g., in alignment with the first sensor 405 along the axis 110) such that the control assembly 375 detects the locking mechanism 80 is in the unlocked position. In other embodiments, the second sensor 410 can be positioned out of alignment with the first sensor 405 when the locking mechanism 80 is in the unlocked position. As a result, the control assembly 375 disables operation of the lawnmower 10.

Figure 12:
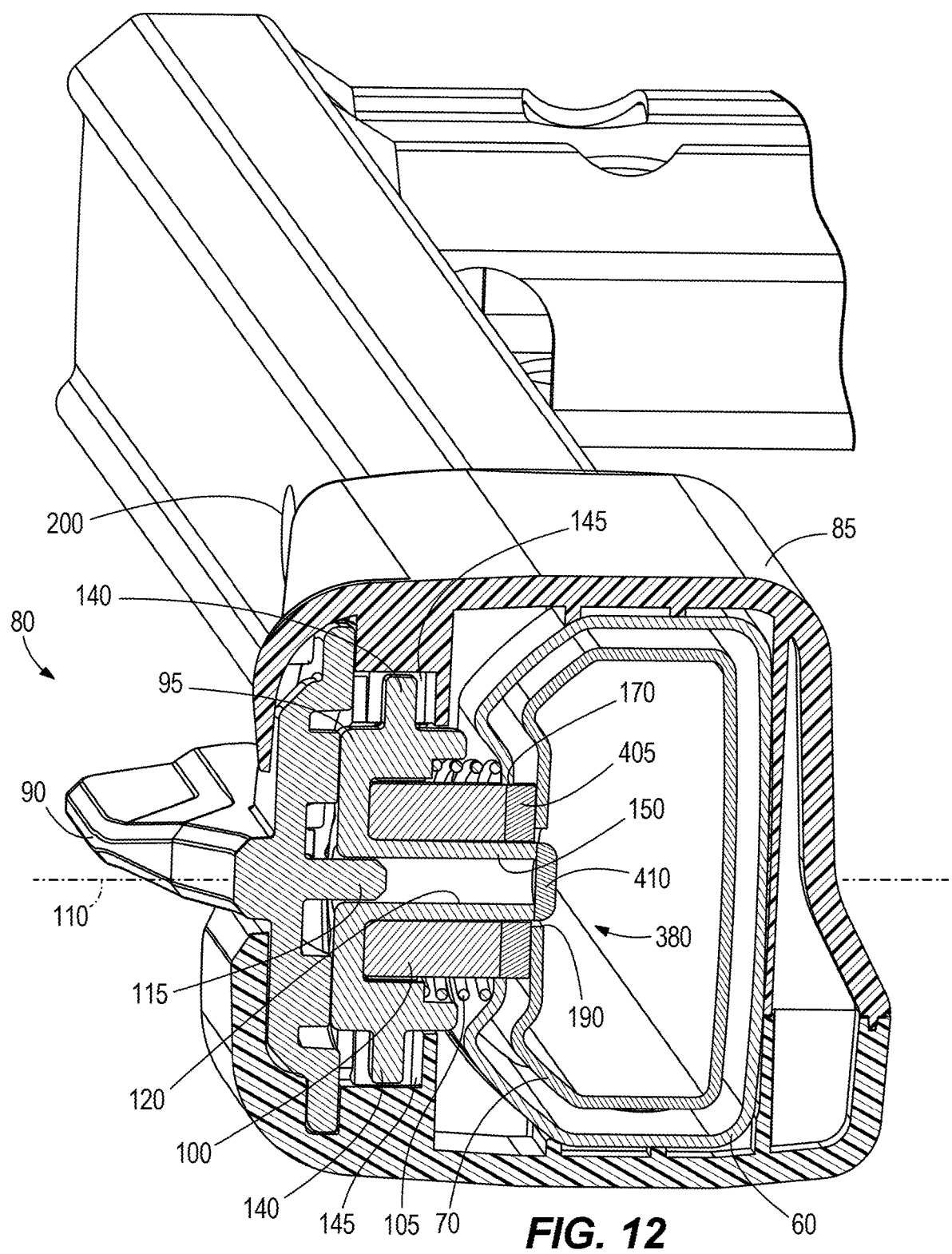
FIG. 12 is a cross sectional view of the locking mechanism of FIG. 9 illustrating the locking mechanism in the locked position while the telescoping handle is in the extended position enabling operation of the lawnmower.

With reference to FIG. 12, the locking mechanism 80 can move into the locked position in which the pin 150 extends through the lower aperture 190 of the inner tube 70 to lock the telescoping handle 45 in the extended position. The second sensor 410 is then positioned relative to the first sensor 405 (e.g., misaligned with the first sensor 405 along the axis 110) such that the control assembly 375 detects the locking mechanism 80 is in the locked position. Again, in other embodiments, the second sensor 410 can be positioned in alignment with the first sensor 405 when the locking mechanism 80 is in the locked position. Accordingly, the control assembly 375 detects the telescoping handle 45 is locked in the extended position to enable operation of the lawnmower 10 once the bail 75 is actuated.

Figure 11:
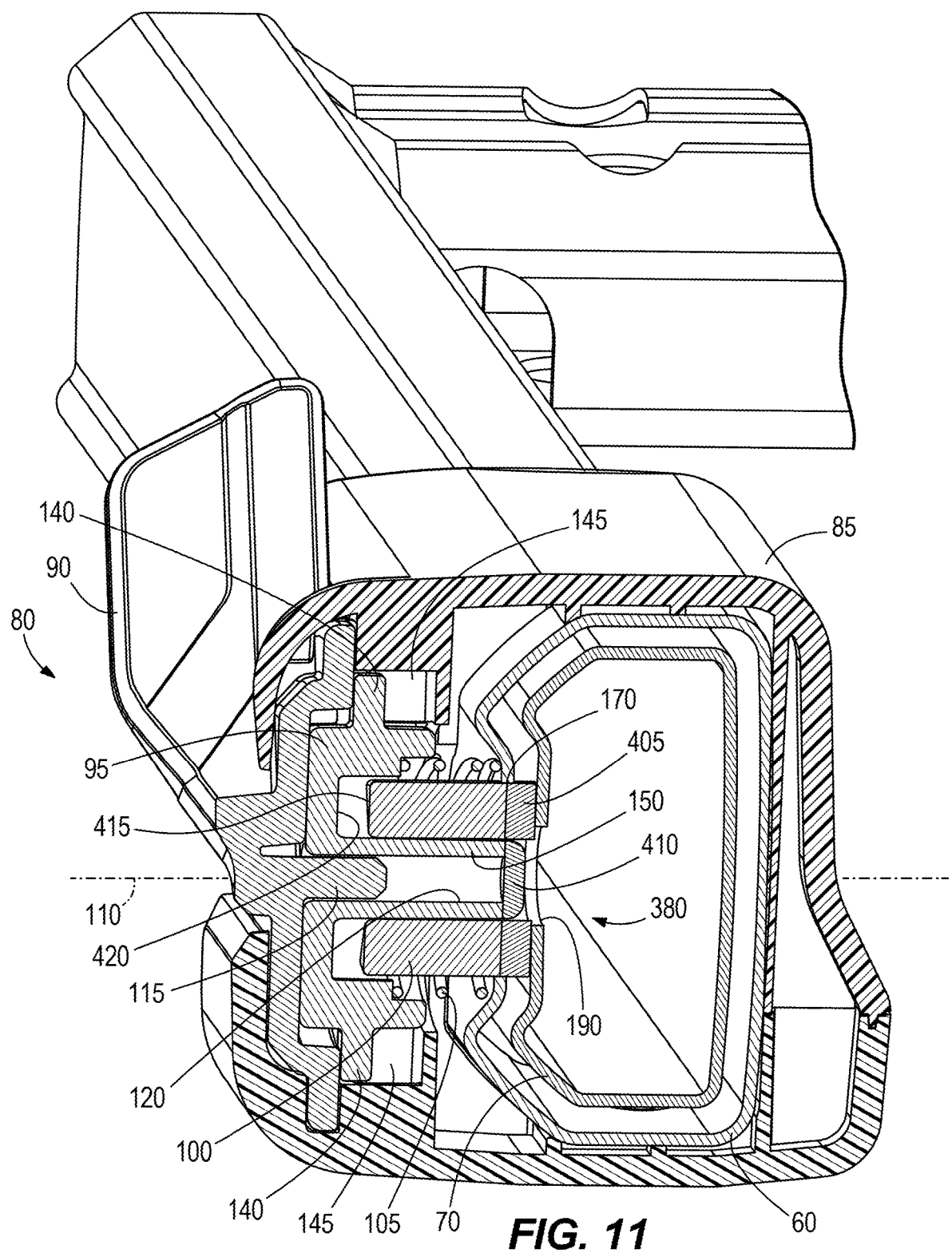
FIG. 11 is a cross sectional view of the locking mechanism of FIG. 9 illustrating the locking mechanism in an unlocked position allowing the telescoping handle to move between the retracted position and the extended position.

In other embodiments, the position sensor 380 can be a contact switch or a proximity sensor between the cam member 95 and the sleeve 100/the outer tube 60. For example, the position sensor 380 can be coupled to an outboard surface 415 of the sleeve 100 (FIG. 11). As such, the control assembly 375 enables operation of the lawnmower 10 when an inboard surface 420 of the cam member 95 (FIG. 11) engages or is positioned at a determined distance from the position sensor 380 on the outboard surface 415. The control assembly 375 then disables operation of the lawnmower 10 when the inboard surface 420 of the cam member 95 disengages or is positioned away from the determined distance relative to the position sensor 380 on the outboard surface 415. In further embodiments, the position sensor 380 can be coupled to the cam member 95 (e.g., the inboard surface 420).

In other embodiments, the position sensor 380 can be a contact switch or surface switch positioned between the lever 90 and the cam member 95 to detect relative movement (e.g., rotational relative movement) of the lever 90 and the cam member 95. For example, the position sensor 380 can be coupled to an inboard surface of the lever 90 (in one embodiment, the position sensor 380 can replace at least one of the protrusions 125) such that engagement of the position sensor 380 and the raised surface 130 of the cam member 95 is detected as the locked position of the locking mechanism 80 to allow operation of the lawnmower 10. Conversely, disengagement of the position sensor 380 and the raised surface 130 disables operation of the lawnmower 10. In some embodiments, the position sensor 380 can be coupled to an outboard surface of the cam member 95 (e.g., coupled to the raised surface 130 or the recessed surface 135). In further embodiments, the position sensor 380 can be between the cam member 95 and the housing 85 of the locking mechanism 80 to detect a position of the cam member 95 relative to the housing 85. In yet further embodiments, the locking mechanism 80 can include a clip latch with the position sensor 380 between two opposing contact surfaces of the clip latch.

Although the disclosure has been described in detail with reference to certain preferred embodiments, variations and modifications exist within the scope and spirit of one or more independent aspects of the disclosure as described. Various features and advantages of the disclosure are set forth in the following claims.

The invention claimed is:

1. An implement configured to be supported on a surface, the implement comprising:
   a main body;
   a working member coupled to the main body;
   a motor coupled to the main body, the motor operable to move the working member;
   a handle configured to guide the implement during operation, the handle including
      a first member coupled to the main body,
      a second member movably coupled to the first member between a retracted position and an extended position, and
      a locking mechanism coupled between the first member and the second member, the locking mechanism movable between a locked position, in which the second member is fixed relative to the first member, and an unlocked position, in which the second member is movable relative to the first member; and
   a control assembly configured to allow operation of the implement in response to the locking mechanism being moved into the locked position,
   wherein the control assembly includes a position sensor in communication with a pin of the locking mechanism, wherein the pin is operable to lock the second member relative to the first member when the locking mechanism is in the locked position, and wherein the pin is operable to allow the second member to move relative to the first member when the locking mechanism is in the unlocked position,
   wherein the control assembly is configured to disable operation of the implement when the position sensor detects the unlocked position of the locking mechanism, and wherein the control assembly is configured to allow operation of the implement when the position sensor detects the locked position of the locking mechanism, and
   wherein the position sensor is coupled to the second member such that the position sensor is movable relative to the first member when the first and second members move between the retracted and extended positions.

2. The implement of claim 1, wherein the position sensor is a contact switch, and wherein the pin of the locking mechanism engages the contact switch when in the locked position.

3. The implement of claim 1, wherein the control assembly is configured to allow operation of the implement when the position sensor detects the locked position of the locking mechanism while the first and second members are in the extended position, and wherein the control assembly is configured to disable operation of the implement when the locking mechanism is in the locked position while the first and second members are in the retracted position.

4. The implement of claim 1, wherein the position sensor is coupled to the locking mechanism such that the position sensor is movable with the second member when the first and second members move between the retracted and extended positions.

5. The implement of claim 4, wherein the position sensor is a hall effect sensor operable to detect a relative position of the pin of the locking mechanism.

6. The implement of claim 1, wherein the implement is a lawnmower and the working member is a cutting blade.

7. A handle configured to be coupled to an implement to guide the implement during operation, the handle comprising:
   a first member configured to be coupled to a main body of the implement;
   a second member movably coupled to the first member between a retracted position and an extended position;
   a locking mechanism coupled between the first member and the second member, the locking mechanism movable between a locked position, in which the second member is fixed relative to the first member, and an unlocked position, in which the second member is movable relative to the first member; and
   a control assembly configured to allow operation of the implement in response to the locking mechanism being moved into the locked position,
   wherein the control assembly includes a position sensor in communication with a pin of the locking mechanism, wherein the pin is operable to lock the second member relative to the first member when the locking mechanism is in the locked position, and wherein the pin is operable to allow the second member to move relative to the first member when the locking mechanism is in the unlocked position,
   wherein the control assembly is configured to disable operation of the implement when the position sensor detects the unlocked position of the locking mechanism, and wherein the control assembly is configured to allow operation of the implement when the position sensor detects the locked position of the locking mechanism, and
   wherein the position sensor is coupled to the second member such that the position sensor is movable relative to the first member when the first and second members move between the retracted and extended positions.

8. The handle of claim 7, wherein the position sensor is a contact switch, and wherein the pin of the locking mechanism engages the contact switch when in the locked position.

9. The handle of claim 7, wherein the control assembly is configured to allow operation of the implement when the position sensor detects the locked position of the locking mechanism while the first and second members are in the extended position, and wherein the control assembly is configured to disable operation of the implement when the locking mechanism is in the locked position while the first and second members are in the retracted position.

10. The handle of claim 7, wherein the position sensor is coupled to the locking mechanism such that the position sensor is movable with the second member when the first and second members move between the retracted and extended positions.

11. The handle of claim 10, wherein the position sensor is a hall effect sensor operable to detect a relative position of the pin of the locking mechanism.

12. A handle configured to be coupled to an implement to guide the implement during operation, the handle comprising:
   a first member configured to be coupled to a main body of the implement;
   a second member movably coupled to the first member between a retracted position and an extended position;
   a locking mechanism coupled between the first member and the second member, the locking mechanism movable between a locked position, in which the second member is fixed relative to the first member, and an unlocked position, in which the second member is movable relative to the first member; and
   a control assembly including a control processor configured to
      detect when the locking mechanism is in the unlocked position,
      disable operation of the implement when the locking mechanism is in the unlocked position,
      detect when the locking mechanism is in the locked position, and
      allow operation of the implement when the locking mechanism is in the locked position,
   wherein the control assembly includes a position sensor in communication with the locking mechanism, and wherein the position sensor is coupled to the second member such that the position sensor is movable relative to the first member when the first and second members move between the retracted and extended positions.

13. The handle of claim 12, wherein the control assembly includes a position sensor coupled to the locking mechanism such that the position sensor is movable with the second member when the first and second members move between the retracted and extended positions.

* * * * *